United States Patent [19]

Peake et al.

[11] Patent Number: 5,337,597
[45] Date of Patent: Aug. 16, 1994

[54] BUBBLE EMISSION VOLUME QUANTIFIER

[75] Inventors: Don A. Peake, Mt. Clemens; Brian M. Weymouth, Marysville, both of Mich.

[73] Assignee: Expertek, Detroit, Mich.

[21] Appl. No.: 840,097

[22] Filed: Feb. 24, 1992

Related U.S. Application Data

[63] Continuation-in-part of Ser. No. 718,546, Jun. 20, 1991, Pat. No. 5,237,856.

[51] Int. Cl.$^5$ ............................................. G01M 3/10
[52] U.S. Cl. ..................................................... 73/45.5
[58] Field of Search ................... 73/45.5, 41.2, 41.3, 73/41.4

[56] References Cited

U.S. PATENT DOCUMENTS

| | | |
|---|---|---|
| 3,248,941 | 5/1966 | McArthur . |
| 3,277,707 | 10/1966 | Rodel . |
| 3,308,660 | 3/1967 | De Ford . |
| 3,323,362 | 6/1967 | Wells . |
| 3,403,555 | 10/1968 | Versaci et al. . |
| 3,592,057 | 7/1971 | Boe et al. . |
| 3,693,436 | 9/1972 | Gildner . |
| 3,815,414 | 6/1974 | Helstrom . |
| 4,691,577 | 9/1987 | Lalin et al. ................ 73/861.05 |
| 4,762,004 | 8/1988 | Lalin et al. ................ 73/861.05 |
| 4,791,805 | 12/1988 | Gates ............................ 73/40.7 |
| 4,854,158 | 8/1989 | Gates ............................ 73/45.5 |
| 4,862,731 | 9/1989 | Gates ............................ 73/40.7 |
| 4,879,907 | 11/1989 | Patterson et al. ........ 73/861.05 |
| 4,903,524 | 2/1990 | Kataoka et al. ............ 73/45.5 |
| 4,924,694 | 5/1990 | Gates ............................ 73/45.5 |

FOREIGN PATENT DOCUMENTS

| | | |
|---|---|---|
| 0421858 | 4/1991 | European Pat. Off. ...... 73/45.5 |
| 831610 | 2/1952 | Fed. Rep. of Germany . |
| 3739166 | 6/1989 | Fed. Rep. of Germany ...... 73/45.5 |
| 3922314 | 1/1991 | Fed. Rep. of Germany ...... 73/45.5 |
| 143823 | 4/1902 | France . |
| 56-40717 | of 1981 | Japan . |
| 17335 | 2/1983 | Japan ............................ 73/45.5 |
| 145430 | 7/1986 | Japan ............................ 73/45.5 |
| 721690 | 3/1980 | U.S.S.R. ...................... 73/45.5 |
| 1417161 | 12/1975 | United Kingdom . |
| 2092742 | 8/1982 | United Kingdom . |

Primary Examiner—Hezron E. Williams
Assistant Examiner—Joseph W. Roskos
Attorney, Agent, or Firm—Dinnin & Dunn

[57] ABSTRACT

The present invention is an apparatus and method for detecting a leak from an object. A bubble collecting tube is used for collecting bubbles emitted from an object and a bubble detecting assembly adjacent the bubble collecting tube is used for detecting a predetermined volume of bubbles collected in the bubble collecting tube to indicate a leak in the object.

16 Claims, 3 Drawing Sheets

BUBBLE EMISSION VOLUME QUANTIFIER

CROSS-REFERENCES TO RELATED APPLICATIONS

The present application is a continuation-in-part of copending application Ser. No. 07/718,546, filed Jun. 20, 1991, now U.S. Pat. No. 5,237,856 and entitled "BUBBLE EMISSION VOLUME QUANTIFIER".

BACKGROUND OF THE INVENTION

1. Field of the Invention

The present invention relates generally to leak detection and, more particularly, to an apparatus and method for detecting leaks based on a volume of bubbles emitted from an object.

2. Description of Related Art

Numerous components are manufactured which must meet a standard for a "leak tightness". Leak tightness is a relative term, as nothing can ever be completely free of leakage. A balance must be made between the increasing cost of finding smaller and smaller leaks and their importance to the functioning of the component over its useful life. Leak tightness is the practical leakage that is acceptable under normal operating circumstances.

Components which require some degree of leak tightness, for example, include fuel tanks, radiators, fuel systems, water pumps, wheels, refrigeration systems, heater cores, torque convertors, hydraulic and pneumatic systems, etc. The acceptable leakage will depend upon the usage of the component with respect to the type of fluid which must be contained, i.e. a gas or a liquid, and whether or not the contents will be pressurized.

There are many devices available to test for the presence of a leak. One method is mass spectroscopy where a high vacuum is drawn around the component and a test gas (helium) is introduced into the component. A spectrometer is used to scan the vacuum space for the presence of helium. Another "test gas" leak detection method is described in U.S. Pat. No. 4,862,731, in which the vacuum exhaust is run past a test gas sensor. It is extremely difficult to quantify a leak using a test gas method of detection because of the difficulty in measuring the amount of trace gas emitted through the leak. Another method of leak detection is air pressure decay where a leak will reduce the vacuum in or surrounding the component tested. While this method does provide a measure of leak quantification, the air pressure decay is time consuming and not well suited for small leaks.

A long-used leak detection technology is the bubble detection method in which a component is submerged in a liquid such as water and bubbles emerging from the component indicate a leak. Improvements on this bubble detection method are shown in U.S. Pat. Nos. 3,590,256; 4,854,158; 4,924,694 and 4,903,524.

While these various devices can identify a "leak" by detecting the passage of one or more bubbles through a given area, and can even count the bubbles passing, none can accurately quantify the volume of the bubbles over time and thus the size of the leak.

Several leak quantifying apparatuses and methods are commonly used in industry. An example of one such leak quantifying apparatus and method is disclosed in U.S. Pat. No. 4,879,907 to Patterson et al. This patented apparatus is a soap film flowmeter which may be used to measure the flow rate of gas leaking from an object over a period of time. The patented flowmeter includes an inverted U-shaped gas flow tube adjustably mounted in a sensor assembly. The flowmeter measures the flow rate of the gas leak by admitting the gas into an inlet of the gas flow tube, introducing a soap film into the interior of the gas flow tube in a region adjacent the inlet, and permitting the entering gas to propel the soap film within the tube past a sensing region. The sensing region measures the elapsed time of the soap film past a pair of detectors and displays the result as a flow rate of the gas leak.

One problem of the above-patented flowmeter is that the flow rate of individual bubbles is measured to detect a leak. This is undesirable because the flow rate may vary between individual bubbles. Another problem of the patented flowmeter is that the volume of bubbles emitted from an object cannot be quantified. Yet another problem of the patented flowmeter is that a soap film is required to measure the flow rate of the gas leak. This is also undesirable because soap films are messy and must be continually supplied.

SUMMARY OF THE INVENTION

It is, therefore, one object of the present invention to provide an apparatus and method for detecting a leak by measuring a volume of bubbles emitted from an object.

It is another object of the present invention to quantify the volume of bubbles emitted from an object.

It is a further object of the present invention to provide a new and improved leak detection apparatus and method.

It is also a further object of the present invention to provide a single station or multiple station apparatus with various leak rate detection at different capturing areas.

It is still a further object of the present invention to provide an apparatus which is adjustable with various set points for different leakage rates.

To achieve the foregoing objects, the present invention is an apparatus for detecting a leak from an object. The apparatus includes bubble collecting means for collecting bubbles emitted from the object and bubble detecting means adjacent the bubble collecting means for detecting a predetermined volume of bubbles collected to indicate a leak in the object.

The present invention is also a method for detecting a leak from an object. The method includes the steps of collecting bubbles emitted from an object in a bubble collecting means. The method also includes detecting a volume of bubbles collected with a bubble detecting means adjacent the bubble collecting means to indicate a leak in the object.

One advantage of the present invention is that a volume of bubbles emitted from an object is collected and measured to detect a leak rather than a flow rate of individual bubbles. Another advantage of the present invention is that the volume of bubbles emitted from the object can be quantified. Still another advantage of the present invention is that actual leak rates of objects can be determined by measuring the bubbles collected over time. A further advantage of the present invention is that it can be automatic or portable. A still further advantage of the present invention is that the apparatus can be a single station tool or a multiple station tool with various leak rate detection at different capturing areas. Yet another advantage of the present invention is that the apparatus is adjustable with various set points for different leakage rates.

Other objects, features and advantages of the present invention will be readily appreciated as the same becomes better understood after reading the following description in light of the accompanying drawings.

DESCRIPTION OF THE PREFERRED EMBODIMENT(S)

Figure 1:
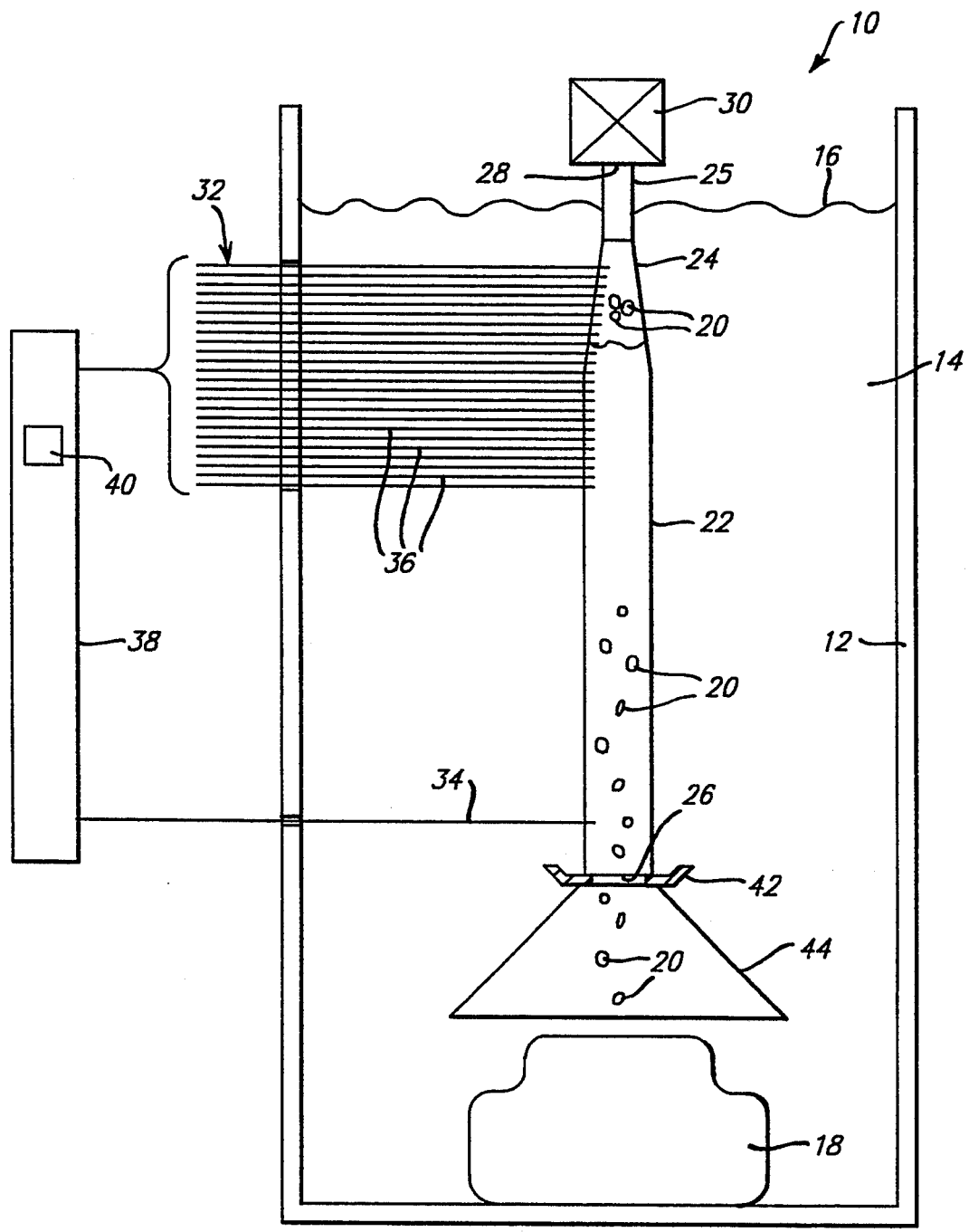
FIG. 1 is an elevational schematic view of a bubble emission volume quantifier apparatus according to the present invention.

Referring to FIG. 1, a bubble emission volume quantifier apparatus 10 according to the present invention is shown. The apparatus 10 is adapted for use in a holding tank 12 which contains a quantity of fluid 14 such as water having a level at 16. The apparatus 10 detects a leak in an object 18 such as a fuel tank by measuring a volume of bubbles 20 emitted from the object 18. It should be appreciated that the bubbles 20 are emitted when the object 18 is submerged in the fluid 14 below the level 16. It should also be appreciated that suitable means may be provided to lower and raise the object 18 into and out of the fluid 14 in the holding tank 12 as disclosed in U.S. Pat. No. 4,924,694, the disclosure of which is hereby incorporated by reference.

The apparatus 10 includes a flow capturing or bubble collecting tube 22 for collecting the bubbles 20 emitted from the object 18. The bubble collecting tube 22 is a generally elongated and linear tube having a tapered or frustoconical portion 24 to a reduced diameter portion 25 at one end. The bubble collecting tube 22 has an inlet 26 at the end opposite the reduced diameter portion 25 and an outlet 28 at the end of the reduced diameter portion 25. Preferably, the bubble collecting tube 22 is made of a transparent material such as glass or clear plastic. It should be appreciated that the bubble collecting tube 22 may be made of any suitable material such as plastic.

The apparatus 10 also includes a purge valve 30 at the outlet 28 to purge gas such as air from the bubble collecting tube 22. The purge valve 30 is conventional and may be manually or automatically operated. It should be appreciated that the bubble collecting tube 22 is disposed within the fluid 14 and the purge valve 30 remains above the level 16 of the fluid 14. It should also be appreciated that the purge valve 30 purges the gas to atmosphere.

The apparatus 10 further includes a bubble detecting assembly, generally indicated at 32, adjacent the bubble collecting tube 22 for detecting a predetermined volume of bubbles 20 collected in the bubble collecting tube 22 to indicate a leak in the object 18. The bubble detecting assembly 32 includes a first pick-up probe or wire 34 extending through the bubble collecting tube 22 and into the interior thereof near the inlet 26. The bubble detecting assembly 32 also includes, at least one, preferably a plurality of second pick-up probes or wires 36 extending through the bubble collecting tube 22 and into the interior thereof a predetermined distance from the outlet 28. Preferably, the second pick-up wires 36 are spaced equally along the bubble collecting tube 28 from each other. Each second pick-up wire 36 is located at a predetermined distance from the outlet 28 and represents a predetermined volume of the bubble collecting tube 22. The first and second pick-up wires 34 and 36 are made of a non-corroding material. Preferably, the first and second pick-up wires 34 and 36 are made of a metal material which is gold plated.

The bubble detecting assembly 32 further includes a controller 38 electrically connected to the first and second pick-up wires 34 and 36, respectively. The controller 38 is connected to or may include a source of power (not shown) such as a low voltage direct current (D.C.) power source. The controller 38 provides a positive electrical charge or voltage to the first pick-up wire 34 and a negative electrical charge or voltage to the second pick-up wires 36. When the bubble collecting tube 22 is disposed in the fluid 14 a sufficient distance below the level 16, fluid fills the interior of the bubble collecting tube 22 between the first and second pick-up wires 34 and 36 and acts as an electrical conducting medium. As a result, a low voltage current flows from the first pick-up wire 34 through the fluid 14 to the second pick-up wires 36. It should be appreciated that the controller 38 may be connected to an alternating current (A.C.) power source and have a transformer for converting the A.C. to D.C. It should also be appreciated that the controller 38 may be connected to the purge valve 30 to control the opening and closing of the purge valve 30.

The controller 38 may include a display 40 such as L.E.D. lights, L.E.D. displays or analog outputs. The controller 38 may also be programmable for automatic sequencing of the method to be described. The controller 38 may further include a clock (not shown) to provide and measure time periods. Such a controller 38 may be of a type 80C31 microprocessor commercially available from Intel Corporation. It should be appreciated that the controller 38 may display the flow rate of the volume of bubbles collected through calculating parameters programmable into the controller 38. Similarly, since a vacuum may be drawn over the water surface or pressurized air injected into the object 18, the controller 38 may determine a relative volume or flow and calculate or convert to an absolute or comparative figure.

The apparatus 10 may include a diverter 42 adjacent the inlet 26 of the bubble collecting tube 22. The diverter 42 is used to divert bubbles 20 away from the inlet 26 of the bubble collecting tube 22 until a predetermined time to reduce bubble adhesion to interior surfaces of the bubble collecting tube 22. The diverter 42 is a stand-by diverter which is moveable to open and close the inlet 26 of the bubble collecting tube 22. It should be appreciated that suitable means may be provided to support and/or move the diverter 42.

The apparatus 10 may further include a channeling device 44 adjacent the inlet 26 of the bubble collecting tube 22 to guide or channel bubbles 20 into the inlet 26. The channeling device 44 is preferably funnel or frustoconically shaped. The channeling device 44 may be integral with the bubble collecting tube 22 or attached thereto. It should be appreciated that suitable means may be provided to support the channeling device 44 below the inlet 26 of the bubble collecting tube 22. It should also be appreciated that the diverter 42 and channeling device 44 may be optional.

Accordingly, the present invention provides a method of operation for detecting a leak in the object 18. In operation, the object 18 is submerged in the holding tank 12 below the level 16 of the fluid 14. The bubble collecting tube 22 is also submerged in the fluid 14 a sufficient distance such that the second pick-up wires 36 are disposed below the level 16 of the fluid 14. The purge valve 30 is actuated to purge any gas from the bubble collecting tube 22 such that fluid 14 fills the interior of the tube 22 and has a barrier or surface 46 at the same level as level 16 of the fluid 14. The inlet 26 of the bubble collecting tube 22 is disposed above the object 18 and over the location where bubbles 20 are being emitted. It should be appreciated that the barrier 46 is originally at a predetermined distance from the outlet 28 to provide a predetermined volume of gas within the tube 28.

When desired or at the beginning of a time period, the diverter 42 is moved to open the inlet 26 to the bubbles 20 emitted from the object 18. The bubbles 20 enter the bubble collecting tube 22 through the inlet 26 and collect near the outlet 28. As the bubbles are collected or accumulated, the volume formed pushes fluid 14 from the bubble collecting tube 22 through the inlet 26. As a result, the barrier 46 of the fluid 14 in the bubble collecting tube 22 moves toward the inlet 26. When the barrier 46 moves below a second pick-up wire 36, negative voltage or current flow to that pick-up wire 36 is interrupted. As a result, the controller 38 displays readings on the display 40 which may correspond either to the volume of bubbles 20 collected or, if time has been measured, the leak rate of the object 18 in terms of volume of bubbles collected over time. It should be appreciated that the original volume of gas within the bubble collecting tube 22 after purging is factored into the displayed readings.

Figure 2:
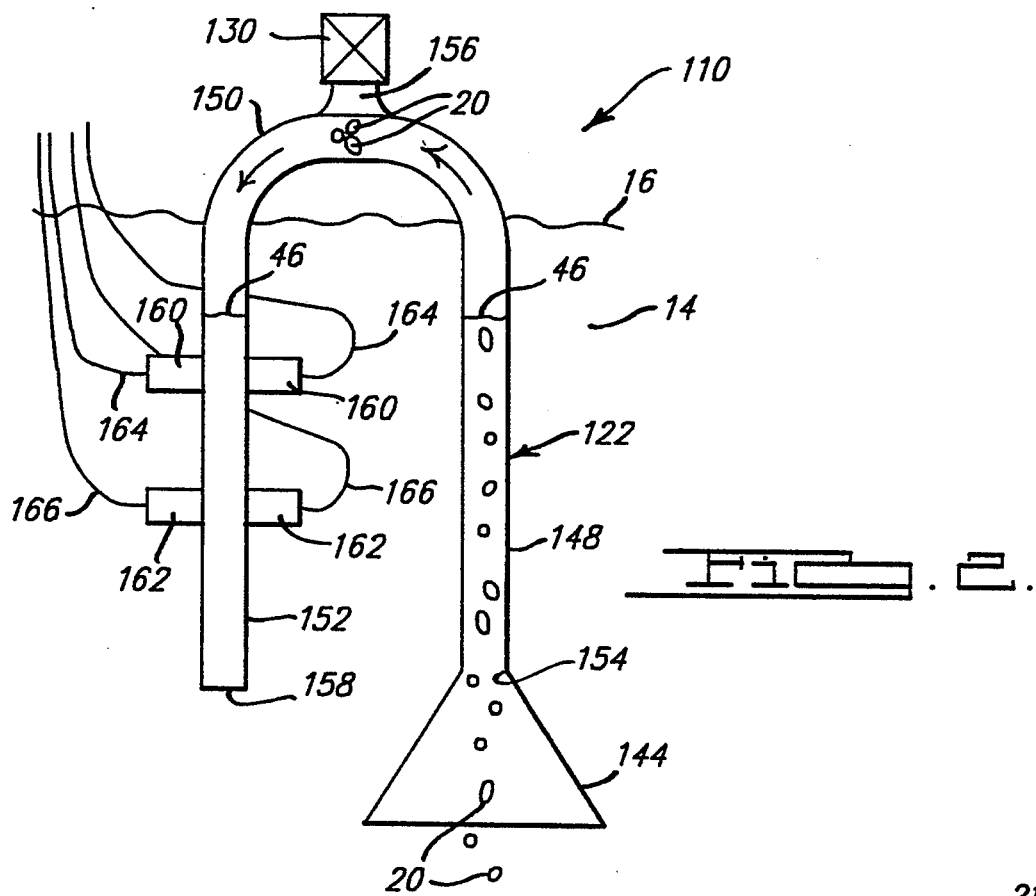
FIG. 2 is an elevational schematic view of a first alternate embodiment of the apparatus of FIG. 1.

Referring to FIG. 2, a first alternate embodiment 110 of the apparatus 10 of FIG. 1 is shown. Like parts of the apparatus 10 have like numerals increased by one hundred (100). The apparatus 110 has a bubble collecting tube, generally indicated at 122, with a generally inverted U-shape. The bubble collecting tube 122 has an entry portion 148 connected to a bend portion 150 which, in turn, is connected to a detection portion 152. The entry portion 148 has an inlet 154 and a channeling device 144 connected at the inlet 154. Preferably, the channeling device 144 is integral with the entry portion 148. The bend portion 150 has a purge port 156 at an apex thereof. The purge valve 130 is connected to the bend portion 150 at the purge port 156. The purge valve 130 operates similar to the purge valve 30. The detection portion 152 has an outlet 158 at one end thereof. The entry portion 148, bend portion 150 and detection portion 152 are integral and preferably of the same diameter.

The bubble detecting assembly 132 is adjacent the detection portion 152 of the bubble collecting tube 122. The bubble detecting assembly 132 includes a plurality, preferably a pair of first sensors 160 and second sensors 162 disposed longitudinally along the detection portion 152. The first sensors 160 are spaced longitudinally from the second sensors 162 along the detection portion 152. The first and second sensors 160 and 162 are, preferably fiber optic connectors, connected to fiber optic cables 164 and 166, respectively. The sensors 160 and 162 receive light from light sources (not shown) which is transmitted through the cables 164 and 166. The cables 164 and 166 are connected at their other ends to photo- cells or photodiodes (not shown) in the controller 38 which convert the light to an electrical signal. The first and second sensors 160 and 162 are disposed on the detection portion 152 to eliminate false signals from foaming which may occur on the entry portion 148 when bubbles 20 are collected.

In operation, the bubble collecting tube 122 is submerged in the fluid 14 a sufficient distance such that the first and second sensors 160 and 162 are disposed below the level 16 of the fluid 14. The purge valve 130 is actuated to purge gas from the bubble collecting tube 122 to atmosphere such that fluid 14 fills the interior of the bubble collecting tube 122 and has a barrier 46 in the entry portion 148 and detection portion 152 at the same level as level 16 of the fluid 14.

When desired or at the beginning of a time period, bubbles 20 enter the bubble collecting tube 122 through the channeling device 144 and inlet 154 and collect in the bend portion 150. As the bubbles are collected or accumulated, the volume formed pushes fluid 14 from the bubble collecting tube 122 through the inlet 154 and outlet 158. As a result, both barriers 46 of the fluid 14 in the bubble collecting tube 122 move toward the inlet 154 and outlet 158. Since the tube 122 is closed to the atmosphere, the air pressure in the bend portion 150 will increase as bubbles are collected, lowering each barrier 46 equally. In this embodiment, only half of the bubble volume is actually measured, which is included in volumetric or flow calculations. When the barrier 46 on the detection portion 152 moves below the first sensors 160, the light transmission to the first sensors 160 is interrupted. This causes an interruption in the signal from the photodiodes which is detected by the controller 38. In this embodiment, the first sensors 160 act as an acceptable trip point for leak detection. As the bubbles 20 continue to collect, the barrier 46 on the detection portion 152 moves below the second sensors 162 which operate similar to the first sensors 160. The second sensors 162 act as a reject trip point for leak detection. Thus, if the bubbles 20 collected from the object 18 trip the second sensors 162, the object 18 will be rejected as having undesired leakage.

Figure 3:
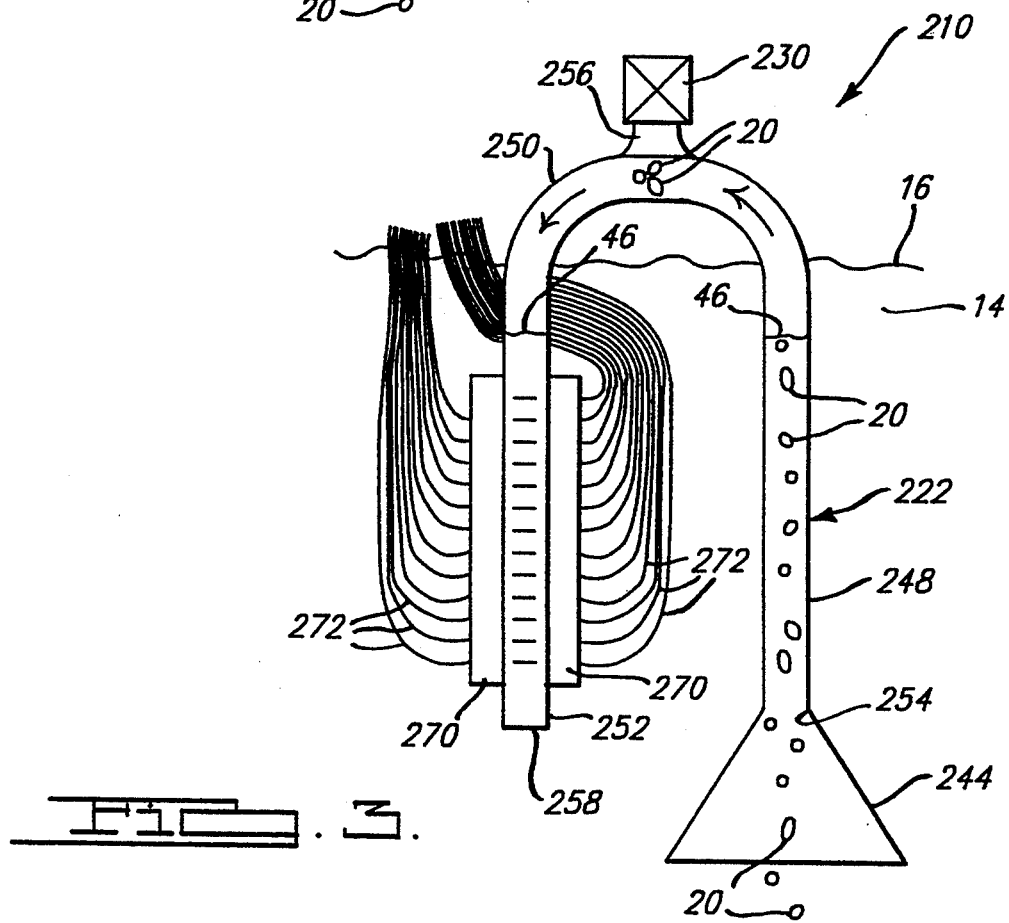
FIG. 3 is an elevational schematic view of a second alternate embodiment of the apparatus of FIG. 1.

Referring to FIG. 3, a second alternate embodiment 210 of the apparatus 10 of FIG. 1 is shown. Like parts have like numerals increased by two hundred (200). The apparatus 210 has a bubble collecting tube 222 which is similar to the bubble collecting tube 122 of FIG. 2 and like parts are increased by one hundred (100). In the apparatus 210, the first and second sensors 160 and 162 are replaced by a plurality of sensors 270 disposed along the detection portion 252. Preferably, the sensors 270 are pairs of fiber optic connectors connected to fiber optic cables 272 and operate similar to sensors 160 and 162. Each pair of fiber optic connectors are spaced equally along the detection portion 252 from each other and represent a predetermined volume of the bubble collecting tube 222. The apparatus 210 operates similar to apparatus 110. It should be appreciated that suitable means are provided for mounting the sensors 270 to the bubble collecting tube 222. It should also be appreciated that when each pair of sensors 270 are tripped, the controller 38 may display readings corresponding to the volume of bubbles collected or leak rate of the object 18.

Figure 4:
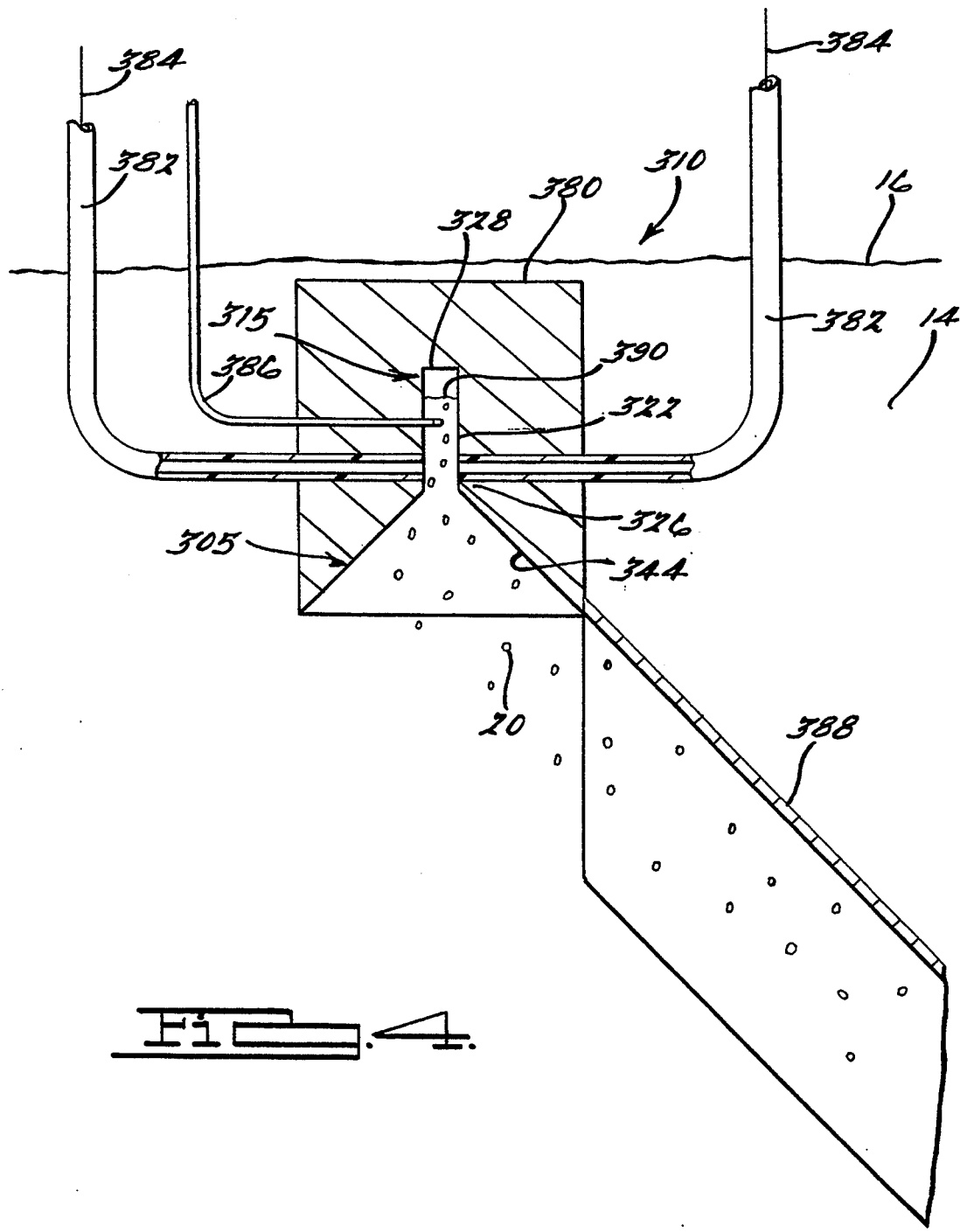
FIG. 4 is an elevational schematic view of a third alternate embodiment of the apparatus of FIG. 1.

Referring to FIG. 4, a third alternate embodiment 310 of the apparatus 10 of FIG. 1 is shown. Like parts have like numerals increased by three hundred (300). The apparatus 310 includes a bubble capturing device 380.

The bubble capturing device 380 is generally rectangular in shape although any suitable shape may be used. The apparatus 310 also includes a bubble collecting tube 322 formed within the bubble capturing device 380. The bubble collecting tube 322 has an inlet 326 and an outlet 328 at the opposite end. It should be appreciated that a purge valve (not shown) is connected to the outlet 328 to purge gas such as air from the bubble collecting tube 322. The apparatus 310 further includes a channeling device 344 adjacent the inlet 326 and formed within the bubble capturing device 380. The channeling device 344 is preferably funnel or frustoconically shaped. It should be appreciated that the bubble capturing device 350 is supported by suitable means in the holding tank 12 as disclosed in U.S. Pat. No. 4,924,691.

The apparatus 310 includes a plurality, preferably a pair of sensors 382, which extend through the bubble capturing device 380 and are opposed from each other along the bubble collecting tube 322. The sensors 382 are, preferably fiber optic connectors, connected to fiber optic cables 384. The sensors 382 receive light from light sources (not shown) which is transmitted through the cables 384. The apparatus 310 also includes at least one pick-up probe or wire 386 extending through the bubble capturing device 380 and bubble collecting tube 322 and into the interior thereof a predetermined distance from the outlet 328 and represents a predetermined volume of the bubble collecting tube 322. It should be appreciated that the pick-up wire 386 is electrically connected to a controller (not shown). It should also be appreciated that a second pick-up wire (not shown) may be provided such that a positive electrical charge or voltage is provided to pick-up wire 386 and a negative electrical charge or voltage is provided to the second pick-up wire to allow electrical current to follow therebetween.

The apparatus 310 may include a guide panel 388 to deflect any bubbles 20 rising from the object 18 into the bubble capturing device 380. The guide panel 388 is disposed in an angular position to the bubble capturing device 380. The guide panel 388 may be similar to that disclosed in U.S. Pat. No. 4,924,694.

In operation, an object 18 is disposed or submerged in a holding tank 12 below the level of the fluid 14. The bubble capturing device 380 is also submerged in the fluid 14 a sufficient distance such that the pick-up wire 386 is disposed below the level 16 of the fluid 14. The purge valve is actuated to purge any gas from the bubble collecting tube 322 such that fluid fills the interior of the bubble collecting tube 322 and has a barrier or surface 390 at the same level as level 16 of the fluid 14. The bubble capturing device 380 and guide panel 388 are disposed above the object 18 where bubbles 20 are being emitted. The bubbles 20 may travel along the guide panel 388 and channeling device 344 and enter the bubble collecting tube 322 through the inlet 326.

When a bubble 20 passes through the sensors 382, a signal is sent to the controller and initiates a start test function, which allows a predetermined amount of time to fill the volume above the pick-up wire 386 with bubbles 20 from the object 18. If the volume above the pick-up wire 386 breaks continuity at the pick-up wire 386 during the allowed time, a reject signal will be displayed by the controller. If the barrier does not break continuity at the pick-up wire 386 during the allowed time, the controller may display an acceptance signal. It should be appreciated that suitable means may be provided to reset the controller for another test.

The apparatus 310 of the present invention may be provided as singly or in multiples as a single station or multiple station tool. The apparatus 310 can also accommodate different leakage rates per specified volumes through the calculation of time vs. leak rates, which may be incorporated in the controller.

Referring to FIG. 1, the apparatus 10 may also include a start test probe or wire 487 extending through the bubble collecting tube 22 and into the interior thereof near the outlet 28. The start test wire 487 is connected to the controller 38. When bubbles 20 are emitted from the object 28, the bubbles 20 enter the bubble collecting tube 22 and break the continuity at the start test wire 487 to initiate a start test on a clock or timer (not shown) in the controller 38 to measure the leak rate or provide an acceptance or reject signal if a single pick-up wire 36 is provided. It should be appreciated that the apparatus 310 may include a start test wire instead of the sensors 382.

Accordingly, the present invention may be automatic or a portable hand held unit. The present invention can be used to quantify leaks in various parts or a plurality of the units may be used to test a number of zones of a given part. The present invention may be used to display actual leak rates through calculating parameters programmed within the controller. One embodiment of the present invention uses low voltage D.C. power in water as the conductor. The present invention may have suitable trip points for a go/no go situation. In another embodiment, a generally U-shaped bubble collecting tube may be used with sensors on a detection portion opposite an entry portion to eliminate the effects of foaming.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An apparatus for detecting a leak from an object, comprising:
   a bubble collecting device for collecting bubbles emitted from an object;
   a bubble detecting assembly adjacent at a predetermined angle to said bubble collecting device for detecting a predetermined volume of bubbles collected to indicate a leak;
   timer means;
   bubble sensing means for detecting the passage of a bubble into said bubble collecting device;
   switch means for starting said timer upon the detection of the passage of a bubble into said bubble collecting device; and
   means for signalling a test failure upon detecting said predetermined volume of bubbles before said timer reaches a predetermined time.

2. The apparatus of claim 1 wherein said bubble detecting assembly comprises an optical sensor.

3. The apparatus of claim 1 wherein said bubble detecting assembly comprises an electrical current sensor.

4. The apparatus of claim 1 wherein said bubble sensing means comprises an optical sensor.

5. The apparatus of claim 1 wherein said bubble sensing means comprises an electrical current sensor.

6. A method for testing for a leak from an object submerged in a liquid, comprising the steps of:
   collecting bubbles emitted from said object in a bubble collecting means;
   detecting a volume of bubbles collected with a bubble detecting means adjacent with the bubble collecting means to indicate a leak in the object; and
   initiating a start test when a bubble passes through an optic area defined by a photoelectric emitter and a photoelectric receptor on opposing sides of said collecting means or said detecting means.

7. A method as set forth in claim 6 including the step of rejecting the object submerged in the fluid when a predetermined volume is achieved within a predetermined time of the start test.

8. A method for testing for a leak from an object submerged in a liquid, comprising the steps of:
   collecting bubbles emitted from said object in a bubble collecting means;
   detecting a volume of bubbles collected with a bubble detecting means adjacent with the bubble collecting means to indicate a leak in the object; and
   initiating the volume detection upon the detection of an initial bubble entering the bubble detecting means.

9. The method as set forth in claim 8 wherein said detection of an initial bubble is achieved by the initial bubble breaking an electrical connection through said liquid to an electrical lead at the top of said bubble detecting means.

10. A method as set forth in claim 8 including the step of issuing a reject signal when a predetermined volume is achieved within a predetermined time of the start test.

11. The method as set forth in claim 8 including the step of resetting the test by clearing any bubbles collected within said bubble detecting means.

12. An apparatus for detecting a leak in an object submerged in a liquid, comprising:
   bubble collecting means for collecting bubbles escaping from the object;
   bubble detecting means adjacent said bubble collecting means for detecting a predetermined volume of bubbles collected to indicate a leak;
   sensor means for detecting the passage of a bubble through said bubble collecting means; and
   means for measuring the time to collect said predetermined volume of bubbles after detecting the passage of a bubble through said bubble collecting means.

13. An apparatus for detecting a leak in an object submerged in a liquid, comprising:
   bubble collecting means for collecting bubble escaping from the object;
   an optical sensor bubble detecting means adjacent said bubble collecting means for detecting a predetermined volume of bubbles collected to indicate a leak; and
   sensor means for detecting the passage of a bubble through said bubble collecting means.

14. An apparatus for detecting a leak in an object submerged in a liquid, comprising:
   bubble collecting means for collecting bubbles escaping from the object;
   an electrical current sensor bubble detecting means adjacent said bubble collecting means for detecting a predetermined volume of bubbles collected to indicate a leak; and
   sensor means for detecting the passage of a bubble through said bubble collecting means.

15. An apparatus for detecting a leak in an object submerged in a liquid, comprising:
   bubble collecting means for collecting bubbles escaping from the object;
   bubble detecting means adjacent said bubble collecting means for detecting a predetermined volume of bubbles collected to indicate a leak; and
   an optical sensor means for detecting the passage of a bubble through said bubble collecting means.

16. An apparatus for detecting a lead in an object submerged in a liquid, comprising:
   bubble collecting means for collecting bubbles escaping from the object;
   bubble detecting means adjacent said bubble collecting means for detecting a predetermined volume of bubbles collected to indicate a leak; and
   an electrical current sensor means for detecting the passage of a bubble through said bubble collecting means.

* * * * *

UNITED STATES PATENT AND TRADEMARK OFFICE
CERTIFICATE OF CORRECTION

PATENT NO. : 5,337,597
DATED : August 16, 1994
INVENTOR(S) : Peake, et al.

It is certified that error appears in the above-indentified patent and that said Letters Patent is hereby corrected as shown below:

Column 10, line 9, Claim 13, "bubble" second occurrence, should be --bubbles--.

Signed and Sealed this

Eighteenth Day of July, 1995

Attest:

BRUCE LEHMAN

Attesting Officer

Commissioner of Patents and Trademarks